(12) United States Patent
Kurasawa et al.

(10) Patent No.: US 6,602,637 B1
(45) Date of Patent: Aug. 5, 2003

(54) SECONDARY BATTERY CASE

(75) Inventors: Yoshihiro Kurasawa, Hiratsuka (JP); Naoto Obayashi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/713,694

(22) Filed: Nov. 15, 2000

(30) Foreign Application Priority Data

| Nov. 17, 1999 | (JP) | ............................................. 11-326304 |
| Jun. 5, 2000 | (JP) | ........................................ 2000-167077 |

(51) Int. Cl.$^7$ ................................................ H01M 2/04
(52) U.S. Cl. ........................................ 429/176; 429/163
(58) Field of Search ................................... 429/176, 163

(56) References Cited

U.S. PATENT DOCUMENTS 6,045,883 A * 4/2000 Akiyama et al. ........... 429/176

FOREIGN PATENT DOCUMENTS

| EP | 0771036 | 5/1997 |
| EP | 0835908 | 4/1998 |
| JP | 8-195188 | 7/1996 |
| JP | 9-120801 | 5/1997 |
| JP | 10-110069 | * 4/1998 |
| JP | 2966526 | 8/1999 |

* cited by examiner

*Primary Examiner*—Laura Weiner
(74) *Attorney, Agent, or Firm*—Edwards & Angell, LLP; David G. Conlin, Esq.; Gregory B. Butler, Esq.

(57) ABSTRACT

The present invention relates to a secondary battery case being molded by a thermoplastic resin composition comprising:

(A) a polyphenylene ether-based resin,
(B) a crystalline polypropylene resin which is a homopolymer or a copolymer of polypropylene, and
(C) a hydrogenated block copolymer comprising an aromatic vinyl compound polymer block and a conjugated diene compound polymer block,
the (A)/(B) ratio by weight being 7/93 to 70/30,
the amount of (C) being 2 to 40 parts by weight based on 100 parts by weight of (A) and (B) combined,
the melt flow rate of said crystalline polypropylene resin (B) being 0.1 to 10 g/10 min as measured according to JIS K-7210 at 230° C. and 21.17 N,
the density of the propylene polymer moiety in said crystalline polypropylene resin being not less than 0.906 g/cm$^3$.

12 Claims, 3 Drawing Sheets

SECONDARY BATTERY CASE

BACKGROUND OF THE INVENTION

The present invention relates to a secondary battery case having excellent mechanical strength, impact resistance, heat resistance, chemical resistance and high weld strength of a weld which have occurred in a molding process, as well as an adhesive strength of welding one parts with at least one of other parts, which battery case can be used in the fields of electrical and electronic devices, automobiles, and various other industrial products.

Closed secondary batteries, such as lead storage battery, nickel-cadmium battery and nickel-hydrogen battery, are widely used as power source of vehicles, especially oversized or special vehicles, electric apparatus, and other various kinds of industrial equipment, and their demand has steadily increased in recent years. According to these demands, enlargement of battery case, diversification of its design, reduction of weight and thickness, etc., are required. Therefore, as regards the material used therefor, request for its further improved qualities such as better moldability, higher strength, higher heat resistance and improved vapor barrier properties has become intense.

As resin for storage battery case, ABS resin (acrylonitrile-butadiene-styrene copolymer) has been used predominantly. ABS resin excels in moldability and also has a good balance of rigidity, strength and dimensional precision, and in fact, it has realized many glorious results in practical use for battery case. ABS resin, however, may prove unsatisfactory in heat resistance or strength in certain uses, and in such cases, modified polyphenylene ether resin has been used. This modified polyphenylene ether resin is a mixture of polyphenylene ether and polystyrene, and it can be provided with desired heat resistance by property changing the ratios of said materials. Also, it is relatively easy to afford flame retardancy to the said resin, so that the said resin is suited for applications where flame retardancy is required.

Both of these resins, however, are permeable to water vapor and have the disadvantage of being poor in vapor barrier properties. So, in case where these resins are used for battery case, water in the electrolyte contained in the battery, which evaporates in long-time use, is allowed to pass through the battery case and dispersed into the atmosphere. Use environment of the batteries tends to become higher in temperature and lower in humidity due to elevation of output and other factors, which serves for elongating the expected service life whereby the electrolyte of the battery tends to reduce. Decrease of electrolyte leads to enlargement of internal resistance of the battery to greatly interfere with discharge performance of the battery, so that development and use of a resin which is as much impervious to water vapor as possible has been desired. ABS resin and modified polyphenylene ether resin, as they are both amorphous type resins, are poor in chemical resistance and therefore unsuited for use as material of the parts which have a possibility to come into contact with chemical substances such as oil in use.

On the other hand, use of polypropylene resin is advantageous in terms of water-vapor barrier effect and chemical resistance. Polypropylene resin is indeed excellent in water vapor barrier properties, chemical resistance and moldability, but it is not necessarily satisfactory in mechanical strength and heat resistance and lacks in long-term reliability as it is poor in creep resistance.

From these circumstances, a closed type secondary battery case made of a resin composition comprising a crystalline polyolefin resin and a polyphenylene ether-based resin was proposed in Japanese Patent Application Laid-Open (KOKAI) No. 8-195188, and a closed type alkali battery using a polymer alloy comprising principally a polyphenylene ether resin and a polyolefin resin was disclosed in Japanese Patent Application Laid-Open (KOKAI) No. 9-120801.

However, the closed secondary battery cases made of these resin compositions, although improved in water-vapor barrier properties, etc., to a certain extent, are still unsatisfactory in weld strength (it is often called as "knit strength") in case where the molded product used as battery case has a weld which have occurred in a molding process. The weld of a molded product occurs in the area where the flows of molten resin in the mold join each other in the molding operation, and is usually lower in the weld strength than other portion. Therefore, low weld strength may cause fracture of the molded product from its weld zone, making it unable to obtain the expected performance of the molded product.

Also, in manufacturing a closed secondary battery, there are the occasions where two molded parts, such as the cover and the body (container) need to be welded with each other. In such occasions, the conventional blend of polyphenylene ether-based resin and polypropylene resin may fail to provide sufficient bonding strength, and when a strong internal pressure is exerted to the battery, the adhesive zone may be unable to endure and may give way. Thus, the problem of low adhesive strength of welding has been raised in the art of manufacture of secondary battery case.

As a result of the present inventors' earnest studies for solving the above problems, it has been found that a secondary battery case comprising a resin composition prepared by blending a polyphenylene ether-based resin, a crystalline polypropylene resin having specific properties and a block copolymer in the specific ratios is provided with excellent mechanical strength, heat resistance, impact resistance, chemical resistance and water-vapor barrier properties as well as high weld strength and adhesive strength of welding.

In the present invention, "weld strength" means a strength at the weld portion (zone) which have occurred in a molding process, and it is often called as "knit strength". And "adhesive strength of welding" means a strength at the adhesive portion (zone) which is generated when the products is made by two or more (plural) parts molded by the thermoplastic composition, and one of the plural parts and at least one of other parts are welded with each other to adhere.

The present invention has been attained on the basis of the above finding.

SUMMARY OF THE INVENTION

The object of the present invention is to provide a secondary battery case having excellent mechanical strength, heat resistance, impact resistance, chemical resistance and water-vapor barrier properties as well as high weld strength and adhesive strength of welding.

To attain the above aim, in the first aspect of the invention, there is provided a secondary battery case being molded by a thermoplastic resin composition comprising:

(A) a polyphenylene ether-based resin, (B) a crystalline polypropylene resin which is a homopolymer or a copolymer of polypropylene, and (C) a hydrogenated block copolymer comprising an aromatic vinyl compound polymer block and a conjugated diene compound polymer block, the (A)/(B) ratio by weight being 7/93 to 70/30,
the amount of (C) being 2 to 40 parts by weight based on 100 parts by weight of (A) and (B) combined,
the melt flow rate of said crystalline polypropylene resin (B) being 0.1 to 10 g/10 min as measured according to JIS K-7210 at 230° C. and 21.17 N,
the density of the propylene polymer moiety in said crystalline polypropylene resin being not less than 0.906 g/cm³.

In the second aspect of the present invention, there is provided a secondary battery case being molded by a thermoplastic resin composition comprising:

(A) a polyphenylene ether-based resin,
(B) a crystalline polypropylene resin which is a homopolymer or a copolymer of polypropylene, and
(C) a hydrogenated aromatic vinyl compound-conjugated diene block copolymer containing 50 to 85% by weight of aromatic vinyl compound units,
the (A)/(B) ratio by weight being 7/93 to 25/75,
the amount of (C) being 3 to 30 parts by weight based on 100 parts by weight of (A) and (B) combined,
the melt flow rate of said crystalline polypropylene resin (B) being 0.1 to 10 g/10 min as measured according to JIS K-7210 at 230° C. and 21.17 N,
the density of the propylene polymer moiety in said crystalline polypropylene resin being not less than 0.906 g/cm³, and
the ratio by weight of (A) to (C), (A)/(C), being 1/1 to 10/1.

In the third aspect of the present invention, there is provided a secondary battery case according to the first aspect, which is a molded product of the thermoplastic resin composition and has a weld zone which have occurred in a molding process.

In the fourth aspect of the present invention, there is provided a secondary battery case according to the first aspect, which contains two or more molded products of the thermoplastic resin composition, the said molded products being welded with each other.

Figure 1:
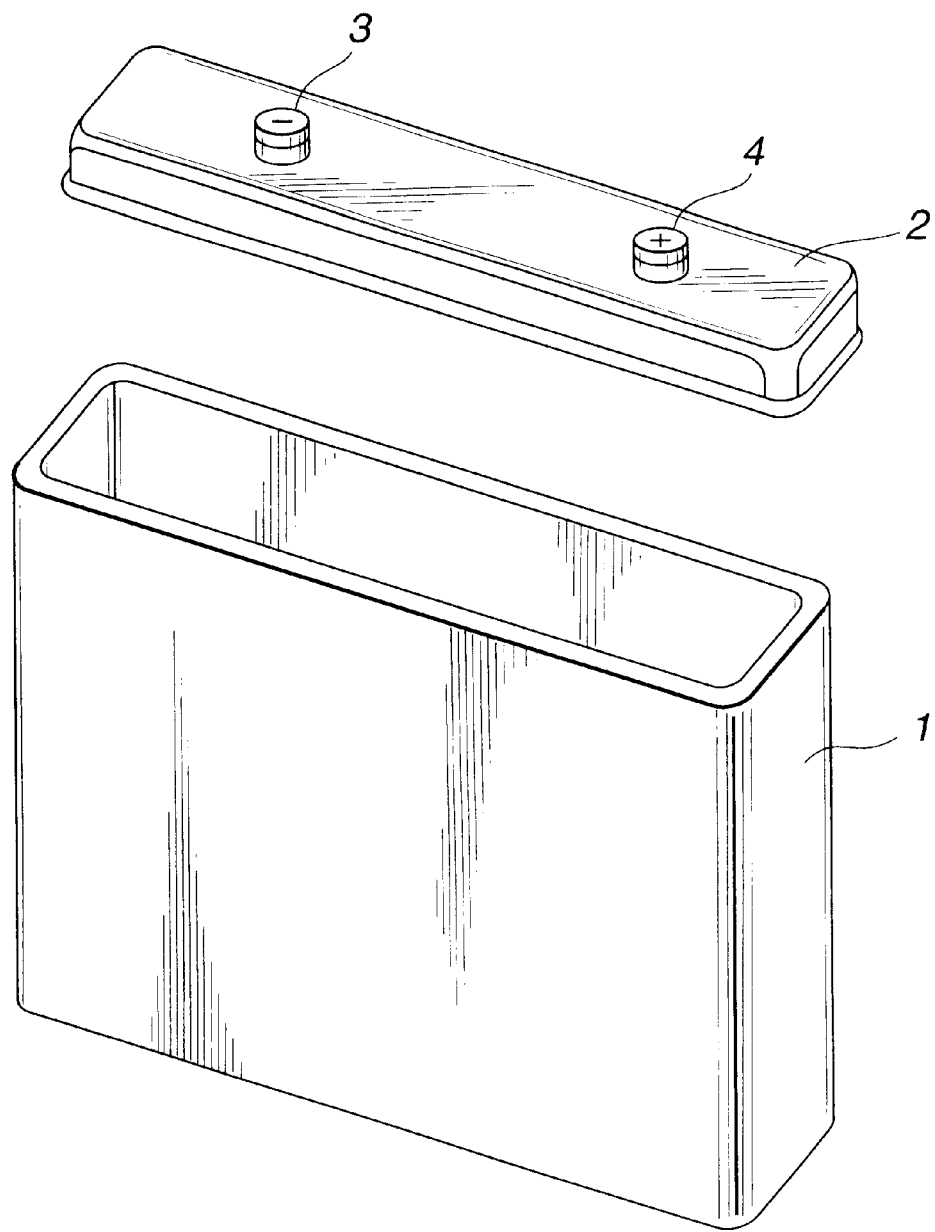
FIG. 1 is a schematic illustration of an example of secondary battery case according to the present invention.

(Denotation of reference numerals) 1: battery case body (container), 2: battery case cover, 3: negative electrode terminal, 4: positive electrode terminal.

Figure 2:
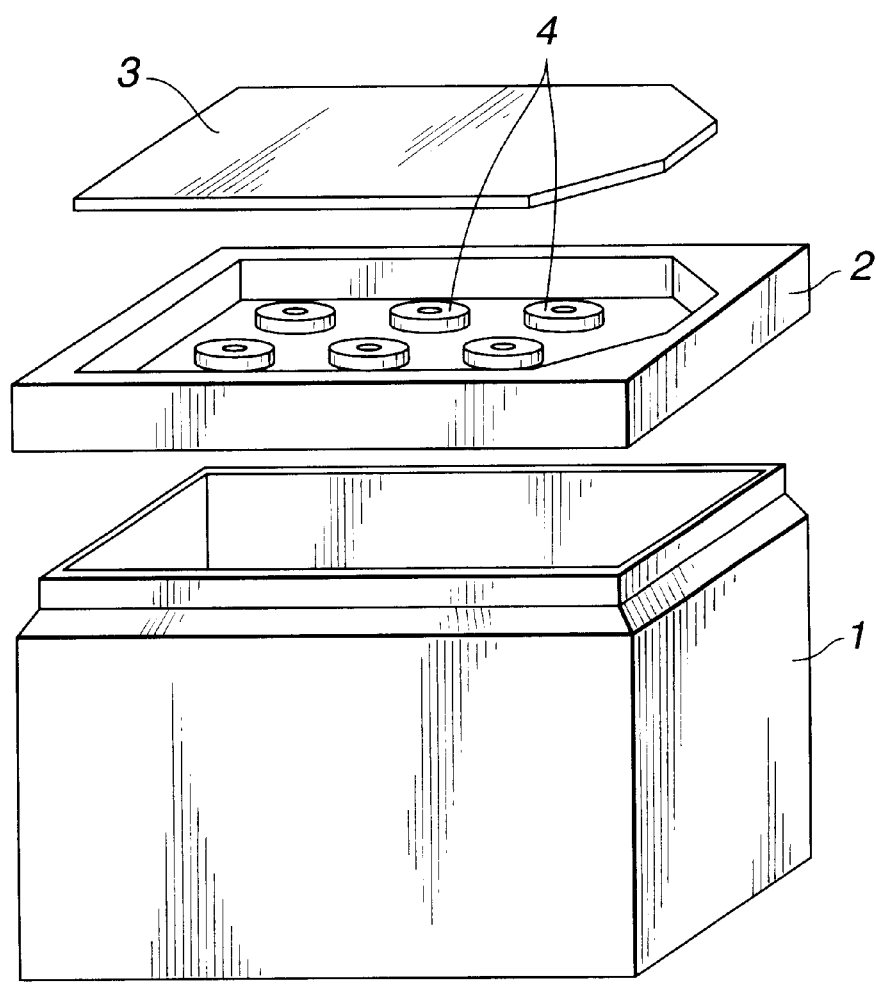

FIG. 2 is a schematic illustration of another example of secondary battery case according to the present invention.

(Denotation of reference numerals) 1: battery case body (container), 2: inner cover, 3: outer cover, 4: electrode terminals.

Figure 3:
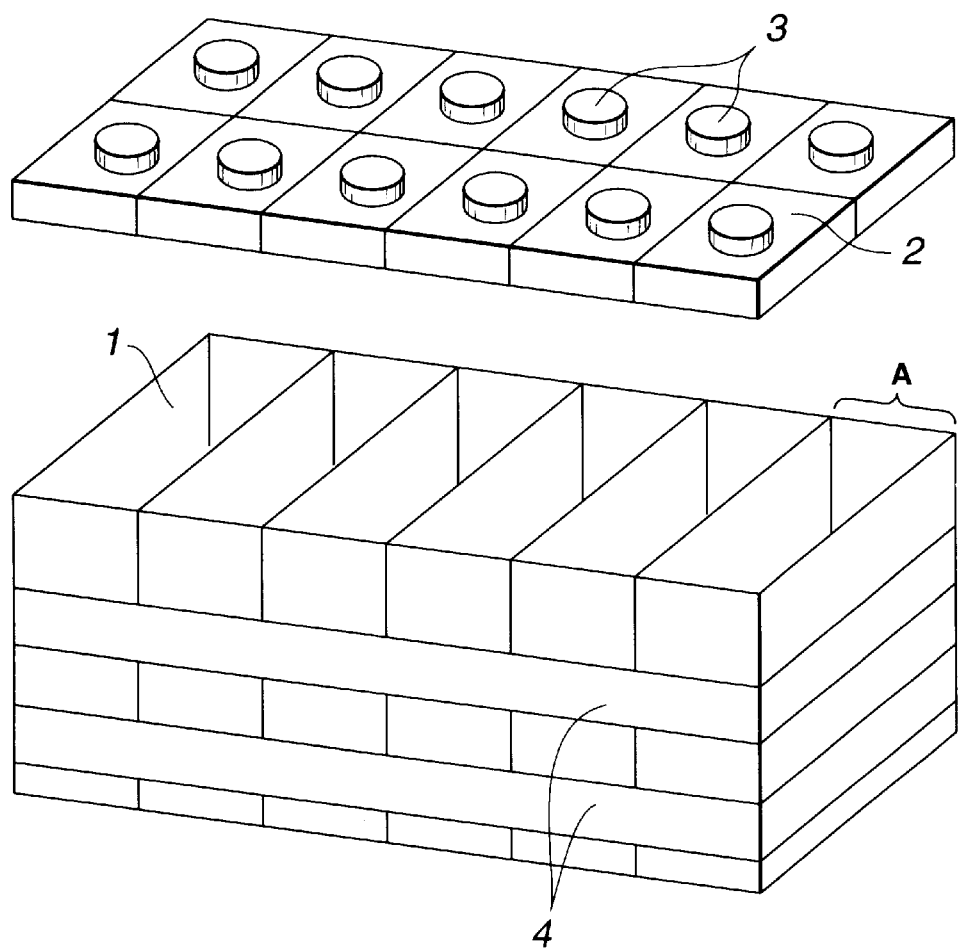

FIG. 3 is a schematic illustration of an example of secondary battery case assembly according to the present invention.

(Denotation of reference numerals) A: unitary battery case, 1: integral battery case body (container), 2: integral cover, 3: electrode terminals, 4: binding bands.

DETAILED DESCRIPTION OF THE INVENTION

"Polyphenylene ether-based resin (A)" used in the present invention is a polyphenylene ether or a mixture of a polyphenylene ether and a styrene-based resin.

"Polyphenylene ether" used in the present invention is a homopolymer or a copolymer having a molecular structure represented by the following formula:

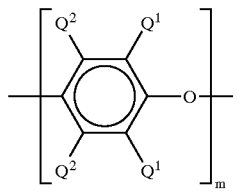

wherein $Q^1$'s represent independently halogen atom, primary or secondary alkyl group, aryl group, aminoalkyl group, hydrocarbon-oxy group or halogen-substituted hydrocarbon-oxy group; $Q^2$'s represent independently hydrogen atom, halogen atom, primary or secondary alkyl group, aryl group, halogen-substituted alkyl group, hydrocarbon-oxy group or halogen-substituted hydrocarbon-oxy group; and m is an integer of not less than 10.

Preferred examples of the primary alkyl groups represented by $Q^1$ and $Q^2$ are methyl, ethyl, n-propyl, n-butyl, n-amyl, isoamyl, 2-methylbutyl, n-hexyl, 2,3-dimethylbutyl, and 2-, 3- or 4-methylpentyl or heptyl. Preferred examples of the secondary alkyl groups represented by $Q^1$ and $Q^2$ are isopropyl, sec-butyl and 1-ethylpropyl. More preferably, $Q^1$ is alkyl group or phenyl group, especially alkyl group having 1 to 4 carbon atoms, and $Q^2$ is hydrogen atom.

The preferred polyphenylene ether homopolymers are those whose molecular structure comprises 2,6-dimethyl-1,4-phenylene ether units.

The preferred polyphenylene ether copolymers are the random copolymers comprising a combination of the above-shown units and 2,3,6-trimethyl-1,4-phenylene ether units. Many preferable examples of homopolymers and random copolymers usable in the present invention are described in the prior literature, and their use is not restricted in the present invention. For example, polyphenylene ethers having introduced thereinto a molecular structural segment for improving such properties as molecular weight, melt viscosity and/or impact strength can be used preferably.

The polyphenylene ether used in the present invention preferably has an intrinsic viscosity at 30° C. (measured in chloroform) of 0.2 to 0.8 dl/g, more preferably 0.2 to 0.7 dl/g, even more preferably 0.25 to 0.6 dl/g. When intrinsic viscosity is less than 0.2 dl/g, the composition may lack in impact resistance, and when intrinsic viscosity exceeds 0.8 dl/g, the composition may be poor in moldability.

The styrene-based resin used in the present invention is preferably polystyrene or rubber-reinforced polystyrene. Its content is preferably in the range from 0 to 80% by weight when the total of polyphenylene ether and styrene-based resin is estimated as 100% by weight. If its content exceeds 80% by weight, heat resistance may lower intolerably.

"Crystalline polypropylene resin (B)" used in the present invention is a crystalline resin having propylene as main structural unit. Examples of such resin are propylene homopolymer and copolymers of propylene (as main constituent) and α-olefins such as ethylene, butene-1, hexene-1, heptene-1 and 4-methylpenetene-1. These copolymers may be random or block copolymers, but block copolymers of the type in which a propylene-α-olefin copolymer is dispersed in a polypropylene homopolymer are preferred. Especially, propylene homopolymer and propylene/ethylene block copolymer are preferred. Density of the propylene homopolymer moiety in the polypropylene resin, as measured according to JIS K 7112, is not less than 0.906 g/cm$^3$, preferably not less than 0.907 g/cm$^3$, more preferably not less than 0.908 g/cm$^3$. Its upper limit is preferably not more than 0.935 g/cm$^3$, more preferably not more than 0.925 g/cm$^3$, even more preferably not more than 0.915 g/cm$^3$. When the density exceeds 0.935 g/cm$^3$, it may be difficult to produce the desired composition. By using a polypropylene resin with a propylene homopolymer density of not less than 0.906 g/cm$^3$, the mechanical strength, heat resistance and water-vapor barrier properties can be improved.

Propylene homopolymer density in the polypropylene resin can be measured according to the underwater replacement method of JIS K 7112 using a specified test piece made by compression- or injection-molding the said polypropylene resin.

In the case of a copolymer, its density can be measured by drawing out the propylene homopolymer in the course of polymerization and conducting the above-described procedure, or by extracting the copolymer moiety using a solvent such as hexane and measuring the density of the residual propylene homopolymer moiety.

Density of the propylene homopolymer moiety in the whole composition can be measured by extracting the composition using a good solvent for polyphenylene ether, such as chloroform, and conducting the above-described procedure with the residual polypropylene resin.

Polypropylene resins with the said density can be produced by a method comprising polymerization or a method in which a nucleating agent is added to a polypropylene resin of low density to raise its density.

As the nucleating agent, it is possible to use any type as far as it is capable of improving crystallizability of polypropylene resin. Typical examples of such nucleating agents include organic nucleating agents such as metal salts of aromatic carboxylic acids, sorbitol-based derivatives, organic phosphates, aromatic amide compounds, etc., and inorganic nucleating agents such as talc, although the nucleating agents usable in the present invention are not limited to those mentioned above. Melt flow rate (MFR, measured according to JIS K 7210 at 230° C. under a load of 21.17 N) of these polypropylene resins is in the range of 0.1 to 10 g/10 min, preferably 0.2 to 8 g/10 min, more preferably 0.3 to 6 g/10 min. When MFR is less than 0.1 g/10 min, the produced composition may be unsatisfactory in moldability, and when MFR is more than 10 g/10 min, the composition may lack in mechanical strength and weld strength.

When (A) (polyphenylene ether-based resin)+(B) (polypropylene resin)=100, the compositional ratio (in parts by weight) of the above-described components (A)/(B) is 7/93 to 70/30, preferably 9/91 to 65/35, more preferably 10/90 to 60/40. When the amount of (A) (polyphenylene ether-based resin) is less than 7 parts by weight, the composition may be unsatisfactory in heat resistance and rigidity, while when the amount of (B) (polypropylene resin) is less than 30 parts by weight, desired water-vapor barrier properties may not be obtained.

In the present invention, in order to improve impact strength, a specified amount of (C) a hydrogenated block copolymer comprising aromatic vinyl compound polymer units A and conjugated diene compound polymer units B is added. The block copolymer is an aromatic vinyl compound-conjugated diene copolymer having at least one chain unit A derived from an aromatic vinyl compound and at least one chain unit B derived from a conjugated diene, and the arrangements of these units A and B include those forming a linear structure, branched structure or tapering structure. These structures may contain in part a random chain derived from an aromatic vinyl compound-conjugated diene random copolymer moiety. In the present invention, the A-B arrangement is preferably the one forming a linear structure, more preferably the one forming a triblock structure.

"(C) Hydrogenated block copolymer" is a block copolymer in which the aliphatic unsaturated groups of the unit B are reduced by hydrogenation, with the ratio of the unsaturated bonds remaining intact from hydrogenation being preferably not more than 20%, more preferably not more than 10% of the ratio before hydrogenation. It may be used in combination with a non-hydrogenated block copolymer.

Preferred examples of the aromatic vinyl compound in the said hydrogenated block copolymer are styrene, α-methylstyrene, paramethylstyrene, vinyltoluene and vinylxylene. Of these, styrene is especially preferred.

Preferred examples of the conjugated diene are 1,3-butadiene, isoprene and 2-methyl-1,3-butadiene.

Examples of the said block copolymers include styrene-butadiene-styrene block copolymer, styrene-isoprene-styrene block copolymer, etc., and these copolymers may be used either singly or by combining two or more of them.

In the aromatic vinyl compound-conjugated diene block copolymer, the percentage of the repeating units of the aromatic vinyl compound is preferably in the range of 20 to 90% by weight, more preferably 30 to 85% by weight, even more preferably 50 to 85% by weight.

As a measure of molecular weight of these hydrogenated block copolymers (C), the value of their toluene solution viscosity at 25° C. is specified to be preferably within the range of 30,000 to 10 cps, more preferably 10,000 to 30 cps. When the viscosity is more than 30,000 cps, the produced composition has difficulties in molding, and when the viscosity is less than 10 cps, the composition may be low in mechanical strength.

The amount of (C) the hydrogenated block copolymer used in the present invention is 2 to 40 parts by weight, preferably 2.5 to 35 parts by weight, more preferably 3 to 30 parts by weight, based on 100 parts by weight of (A) (polyphenylene ether-based resin) and (B) (crystalline polypropylene resin) combined. When the amount of the said hydrogenated block copolymer exceeds 40 parts by weight, the composition tends to lower in rigidity.

The (A) (polyphenylene ether-based resin)/(C) (hydrogenated block copolymer) ratio by weight is usually 1/1 to 10/1, preferably 1.2/1 to 8/1, especially 1.4/1 to 6/1. When the (A)/(C) ratio is less than 1/1, heat resistance may be unsatisfactory, and when this ratio exceeds 10/1, impact resistance may lower.

In the present invention, when the (A) (polyphenylene ether-based resin)/(B) (crystalline polypropylene resin) ratio by weight is in the range of 7/93 to 25/75, particularly high adhesive strength of welding can be obtained by using 3 to 30 parts by weight of the block copolymer (C) based on 100 parts by weight of (A) and (B) combined. The preferred range of the (A)/(B) ratio by weight is 9/91 to 22/78, more preferably 10/90 to 19/81. In this case, the ratio of the repeating units derived from an aromatic vinyl compound in the block copolymer (C) is preferably in the range of 50 to 85% by weight, more preferably 55 to 85% by weight, even more preferably 60 to 80% by weight. When this ratio is less than 50% by weight, the produced composition may lack in mechanical strength and heat resistance, while when this ratio exceeds 85% by weight, the composition may be unsatisfactory in impact resistance.

The matrix constituting a continuous phase of the thermoplastic resin composition of the present invention is preferably formed with a crystalline polypropylene resin which is a homopolymer or a copolymer, in view of moldability and water-vapor barrier properties. In forming the matrix with a crystalline polypropylene resin, the ratio of melt viscosity of the polyphenylene ether-based resin ($\eta a$) to melt viscosity of the crystalline polypropylene resin ($\eta b$), $\eta a/\eta b$, is preferably high, but a too high $\eta a/\eta b$ ratio is undesirable because of reducing impact strength. Specifically, the $\eta a/\eta b$ ratio as measured at 280° C. and a shear rate of 100 sec$^{-1}$ is preferably 0.3 to 100, more preferably 0.5 to 50, especially preferably 1 to 30. When $\eta a/\eta b$ is less than 0.3, it is difficult for the crystalline polypropylene resin to form a matrix, and when $\eta a/\eta b$ exceeds 100, impact strength tends to lower.

The resin composition of the present invention may further contain if necessary other substances commonly used in preparation of thermoplastic resins, such as antioxidant, weathering agent, nucleating agent, impact modifier, plasticizer, fluidity improver, etc.

Addition of an organic filler, reinforcing agent or inorganic filler such as glass fiber, talc, mica, kaolin, calcium carbonate, silica, clay, etc., is especially effective for improving rigidity, heat resistance and dimensional stability. Various types of known coloring agents and their dispersing media can also be contained for practical use.

In the present invention, it is also preferable to add a flame retardant for providing flame retardancy to the composition. Various known types of flame retardants can be used in an amount appropriate for obtaining a desired level of flame retardance. Preferably, a phosphorus-based, halogen-based or inorganic flame retardant and/or flame retarding assistant are used in a total amount of usually around 1 to 50 parts by weight based on 100 parts by weight of the base resin.

For producing the resin composition of the present invention, there can be used the various methods, for example, a method in which the said component materials are mixed by a suitable mixer such as single- or multi-screw kneader, Banbury mixer, roll mill, Brabender Plastograph, etc., and then the mixture is cooled and solidified (melt mixing method), or a method in which the said component materials are added to a suitable solvent, for example, a hydrocarbon such as hexane, heptane, benzene, toluene, xylene, etc., or its derivative, and the dissolved components are mixed with each other, or the dissolved components and the non-dissolved components are mixed in a suspended state (solvent mixing method). The former method (melt mixing method) is preferred in terms of industrial cost. The methods usable in the present invention are not limited to those mentioned above.

The molding method for the secondary battery case according to the present invention is not specified; it is possible to apply the molding methods generally used for molding of the thermoplastic resin compositions, such as injection molding, blow molding, extrusion molding, sheet molding, thermoforming, rotary molding, laminate molding, etc.

The secondary battery case according to the present invention is not limited to specific types but versatile provided that it is usable for the secondary batteries which are capable of repetitive charge and discharge and used in the various fields of industry, such as electrical and electronic field, field of automobiles, etc. In the present invention, the secondary battery case comprises one molded battery case part or two or more molded battery case parts using a specific thermoplastic resin defined above, and in some cases, it comprehends separators (electrode group) and a cover (a cap) in addition to the battery case body (container) housing the electrodes, electrolyte, etc.

In the secondary battery case of the present invention, in case where the molded parts forming the battery case are the ones having a weld (zone) specified in the present invention, this battery case is particularly remarkable in that it is proof against destruction from the weld. The weld zone is the area where the melting resin flows injected separately from plural gates formed in the mold in injection molding the battery case impinge against each other, or the area around a hole in the molded products where the melting resin flow collide against each other.

In case where the battery case is made up of two or more parts, these parts were joined together by adhesion by bonding agent, heat adhesion by welding, vibration adhesion by welding or other like means. In the case of adhesion by bonding agent, for instance an epoxy resin bonding agent can be used. The epoxy resin bonding agent used here is a two-part bonding agent comprising a resin having an epoxy skeletal structure as base and a curing agent. The base/curing agent two-part bonding agents excel in strength, heat resistance, chemical resistance, acid resistance and alkali resistance. In such two-part bonding agents, the epoxy resin used as base is liquid or low-melting point solid at normal temperature, and is blended with a curing agent and cured when applied.

The secondary battery case of the present invention is preferably applied as a battery case comprising two or more parts molded by the thermoplastic resin composition and being welded one of those parts with at least one of other parts. That is, the battery case of the present invention preferably has a zone (or zones) where two or more parts were welded with each other. For example, the battery case comprises a battery case body housing the power generating elements comprising the positive and negative electrodes, an electrolyte and a separator, and a cover for sealing or blocking the opening of the battery case body, said two parts being welded with each other.

"Welding" used in the present invention is a means for joining a molded part of a resin composition to another molded part, or for joining a portion of a molded part to another portion of the same molded part, by fusing or melting the particular sections and uniting or bonding at the sections. Such welding methods include hot plate bonding, vibration bonding and ultrasonic bonding. No specific restrictions are imposed on the welding conditions, but it is preferable that the surface temperature of the part to be bonded in the bonding operation is kept at 170 to 340° C., more preferably 190 to 320° C., especially 190 to 300° C.

A preferred example of such battery cases is a closed secondary battery case. "Closed secondary battery" refers to all the closed type batteries capable of repetitive charge and discharge, examples of which include lead storage battery, Ni-cadminum battery, Ni-hydrogen battery, lithium ion battery and the like. Such a battery case finds particularly useful application to the closed secondary batteries built in video tape recorders, timepieces (watches), etc., and in the present invention, it is especially recommended to apply as a case for the closed secondary batteries used as a driving power source of the electric cars, etc.

Schematic illustrations of the examples of secondary battery case embodying the present invention are shown in FIGS. 1 to 3, but the present invention is not limited to these embodiments. FIG. 1 illustrates a battery case comprising a body 1 and a cover 2 provided with a negative electrode terminal 3 and a positive electrode terminal 4. The body 1 and the cover 2 are welded by fusion or melt bonding with heat or other means. FIG. 2 illustrates a battery case comprising a body 1, an inner cover 2 provided with electrode terminals 4, and an outer cover 3 designed to cover the electrode terminals 4. The body 1 and the inner cover 2, and the inner cover 2 and the outer cover 3, are welded by fusion or melt bonding with heat or other means. The inner and outer covers may be bonded by a bonding resin agent or the like. FIG. 3 illustrates an integral aggregate of the battery case unit A such as shown in FIG. 1 or 2, in which plural of the battery case unit A are arranged in series and bound to each other by binding bands 4. Such a set of battery cases may not be a simple assembly of the plural battery case units bound to each other by binding bands; it may be an integrally molded article whose configuration is diversified. The battery case assembly shown in FIG. 3 is of a structure in which the electrode terminals 3 are provided in the integrally molded cover 2, with each battery unit housed therein being capable of being electrically connected to another battery unit.

The secondary battery case of the present invention, because of its high mechanical strength and heat resistance, has excellent deformation properties in the high-temperature and high-load environment, and is also high in safety at the time of an impact because of excellent impact resistance, and in the event of attachment of oil because of excellent chemical resistance. Further, because of excellent water-vapor barrier properties, the battery case of the present invention has the advantage of being capable of preventing loss of water in the battery with consequent elongation of the service life, and because of high weld strength, the molded part forming the battery case has high strength. Also, because of excellent adhesive strength of welding, the battery case shows high strength in application to closed type secondary batteries and other products. Thus, the present invention can well satisfy the exacting quality requirements for the closed secondary battery case.

EXAMPLES

The invention will be described in more detail by showing the examples thereof, but it is to be understood that these examples are merely intended to be illustrative and not to be construed as limiting the scope of the invention. In the following Examples, the materials shown below were used as components.

1. Polyphenylene ethers (PPE)
    PPE-1: poly-2,6-dimethyl-1,4-phenylene ether (produced by Mitsubishi Engineering-Plastics Corporation; intrinsic viscosity measured in chloroform at 30° C.=0.40 dl/g)
    PPE-2: poly-2,6-dimethyl-1,4-phenylene ether (produced by Mitsubishi Engineering-Plastics Corporation; intrinsic viscosity measured in chloroform at 300° C.=0.50 dl/g)
2. Polystyrene (PS)
    Trade name: HT478 (rubber-reinforced polystyrene) produced by A & M Styrene Co., Ltd.
3. Crystalline polypropylene resins (PP)
    PP-1: Propylene homopolymer (MFR=0.5 g/10 min, density of propylene homopolymer moiety=0.909 g/cm$^3$)
    PP-2: propylene homopolymer (MFR=1.0 g/10 min, density of propylene homopolymer moiety=0.909 g/cm$^3$)
    PP-3: propylene homopolymer (MFR=0.5 g/10 min, density of propylene homopolymer moiety=0.904 g/cm$^3$)
    PP-4: propylene homopolymer (MFR=20 g/10 min, density of propylene homopolymer moiety=0.909 g/cm$^3$)
    PP-5: propylene-ethylene copolymer (MFR=15 g/10 min, density of propylene homopolymer moiety=0.909 g/cm$^3$)
4. Hydrogenated block copolymers comprising an aromatic vinyl compound polymer block(s) and conjugated diene compound polymer block(s) (SEPS)
    SEPS-1: trade name: SEPTON 2104 (hydrogenated styrene-isoprene-styrene copolymer, styrene unit content=65 wt %) produced by Kuraray Co., Ltd.
    SEPS-2: trade name: SEPTON 2007 (hydrogenated styrene-isoprene-styrene copolymer, styrene unit content=30 wt %) produced by Kuraray Co., Ltd.

Evaluations were made by the following methods.

(a) Izod Impact Test

A notched Izod impact test was conducted according to ASTM D 256.

(b) Flexural Modulus

A three-point bending test was conducted according to the bending test method of ASTM D 790.

(c) High-temperature Flexural Modulus

A three-point bending test was conducted at 80° C. according to the bending test method of ASTM D 790.

(d) Deflection Temperature Under Load

A deflection-under-load test was conducted under 1.82 MPa according to ASTM D 648.

(e) Chemical Resistance

1% bending strain was given to an injection molded test piece, and while in this state, gasoline was applied to the area of the maximum strain. After 48-hour standing, the surface condition of the test piece was visually observed and rated as follows: ○: No change; x: Cracked.

(f) Weld Strength

A tensile test piece prepared according to ASTM D 638 was injection molded by an injection molding machine (mfd. by Japan Steel Works, Ltd.; clamping force: 55 T), with a gate provided at both ends, under the conditions of cylinder temperature=260° C.; a mold temperature=40° C. In this test piece, weld was formed at its center. This test piece was subjected to a tensile test to determine its breaking strength, which was shown as weld strength (knit strength). Meanwhile, this test piece was also similarly injection molded with a gate provided at one end alone (molded piece having no weld) and the molded piece was subjected to the same tensile test to determine yield strength. The previously determined weld strength was divided by yield strength of the molded piece having no weld, and the quotient was shown as weld strength retention.

(g) Creep Rupture Time of Weld Zone

The above test piece having weld was subjected to a tensile creep test under the conditions of 95° C. and 5.9 MPa, and the time which elapsed till rupture took place was measured.

(h) Water-vapor Permeability

The resin composition was molded into a 150 mm×150 mm×1 mm thick sheet by an injection molding machine (mfd. by Japan Steel Works, Ltd., clamping force 150 T) at a cylinder temperature of 250° C. and a mold temperature of 60° C., and water-vapor permeability of the molded sheet under 90% humidity was evaluated according to JIS K 7129 Method B at 40° C.

(i) Propylene Resin Density

In case where the propylene resin was a propylene homopolymer, this propylene resin per se was injection molded to obtain an Izod test piece, while in case where the propylene resin was a propylene-ethylene block copolymer, the propylene homopolymer was drawn out upon completion of polymerization, and this propylene homopolymer was injection molded to obtain an Izod test piece. Injection molding was conducted at a cylinder temperature of 220° C. and a mold temperature of 40° C. in both cases. From the mass in the air and the mass in water of the test piece, the resin density at 23° C. was determined from the following equation according to JIS K 7112 Underwater Replacement Method:

$$\rho = K \cdot a/(a-b)$$

ρ: sample density (g/cm³)

K: water density (g/cm³)

a: sample mass (g) in the air b: sample mass (g) in water (j) Adhesive Strength of Welding The resin composition was molded into the 12.7 mm×127 mm×2 mm thick test pieces by an injection molding machine (mfd. by Japan Steel Works, Ltd.; clamping force= 50 T) at a cylinder temperature of 250° C. and a mold temperature of 60° C. The 12.7 mm side of each of the two test pieces was brought into contact with a 285° C. hot plate under a load of 3 N for 20 seconds, and immediately after separated from the hot plate, the fused sides of the two test pieces were pressed against each other under a load of 3 N for 20 seconds and thereby welded by fusion or melt bonding. The thus obtained fusion bonded test piece was subjected to a tensile test at a pulling rate of 10 mm/min by an Instron type universal tester to determine rupture strength, which was expressed as adhesive strength of welding.

Examples 1 to 3

The components shown in Table 1 were melted and mixed by a double-screw extruder (mfd. by Japan Steel Works, Ltd.) at a screw speed of 250 rpm and 230° C. to obtain the resin compositions. These resin compositions were molded by an injection molding machine (mfd. by Japan Steel Works, Ltd., clamping force=55 T) at a cylinder temperature of 260° C. and a mold temperature of 40° C., and the molded pieces were evaluated in the manner described above.

Comparative Examples 1 to 5

Using the components shown in Tables 1 and 2, the resin compositions were obtained and injection molded in the same way as in Example 1, and the molded pieces were similarly evaluated.

TABLE 1

|  | Example 1 | Example 2 | Example 3 | Comp. Example 1 |
|---|---|---|---|---|
| PPE-1 (parts by weight) | 40 | 40 | 40 | 40 |
| PS (parts by weight) | — | — | 10 | — |
| PP-1 (parts by weight) | 60 | — | 50 | — |
| PP-2 (parts by weight) | — | 60 | — | — |
| PP-3 (parts by weight) | — | — | — | 60 |
| SEPS-1 (parts by weight) | 15 | 10 | 10 | 15 |
| (a) Izod impact strength (J/m) | 300 | 150 | 170 | 320 |
| (b) Flexural modulus (MPa) | 1930 | 1970 | 2100 | 1540 |
| (d) Deflection temperature under load (° C.) | 105 | 107 | 113 | 93 |
| (f) Weld strength (MPa) | 26 | 28 | 23 | 21 |
| (f) Weld strength retention (%) | 70 | 81 | 65 | 60 |

TABLE 1-continued

|  | Example 1 | Example 2 | Example 3 | Comp. Example 1 |
|---|---|---|---|---|
| (g) Creep rupture time (hrs) | 8 | 21 | 4 | 1 |
| (e) Chemical resistance (° C.) | ○ | ○ | ○ | ○ |
| (h) Water-vapor permeability (g/m² · 24 h) | 0.6 | 0.6 | 0.7 | 1.1 |

TABLE 2

|  | Comp. Example 2 | Comp. Example 3 | Comp. Example 4 | Comp. Example 5 |
|---|---|---|---|---|
| PPE-1 (parts by weight) | 40 | 40 | 5 | 50 |
| PS (parts by weight) | 10 | — | — | 30 |
| PP-1 (parts by weight) | — | — | 95 | 20 |
| PP-3 (parts by weight) | 50 | — | — | — |
| PP-4 (parts by weight) | — | 60 | — | — |
| SEPS-1 (parts by weight) | 10 | 15 | 15 | 15 |
| (a) Izod impact strength (J/m) | 190 | 95 | 330 | 86 |
| (b) Flexural modulus (MPa) | 1580 | 1910 | 1300 | 2230 |
| (d) Deflection temperature under load (° C.) | 95 | 100 | 67 | 120 |
| (f) Weld strength (MPa) | 19 | 26 | 29 | 16 |
| (f) Weld strength retention (%) | 48 | 70 | 90 | 32 |
| (g) Creep rupture time (hrs) | 1> | 8 | 20 | 1> |
| (e) Chemical resistance (° C.) | ○ | ○ | ○ | X |
| (h) Water-vapor permeability (g/m² · 24 h) | 1.2 | 0.7 | 0.4 | 2.4 |

Examples 4 to 11 and Comparative Examples 6 to 9

The resin components shown in Tables 3, 4 and 5 were melted and mixed by a double-screw extruder (mfd. by Japan Steel Works, Ltd.) at a screw speed of 250 rpm and a cylinder temperature of 230° C. to obtain the resin compositions. These resin compositions were molded by an injection molding machine (mfd. by Japan Steel Works, Ltd., clamping force=55 T) at a cylinder temperature of 260° C. and a mold temperature of 40° C., and the molded pieces were evaluated in the manner described above.

TABLE 3

|  | Example 4 | Example 5 | Example 6 | Example 7 |
|---|---|---|---|---|
| PPE-1 (parts by weight) | 15 | 20 | — | — |
| PPE-2 (parts by weight) | — | — | 20 | 13 |
| PS (parts by weight) | — | — | 2 | 2 |
| PP-1 (parts by weight) | 85 | 80 | 78 | 85 |
| SEPS-1 (parts by weight) | 7.5 | 10 | 10 | 5 |
| (a) Izod impact strength (J/m) | 220 | 260 | 300 | 240 |

TABLE 3-continued

|  | Example 4 | Example 5 | Example 6 | Example 7 |
|---|---|---|---|---|
| (b) Flexural modulus (MPa) | 2000 | 2020 | 1960 | 1980 |
| (c) High-temperature bending modulus (MPa) | 720 | 760 | 750 | 710 |
| (d) Deflection temperature under load (° C.) | 87 | 93 | 91 | 86 |
| (f) Weld strength (MPa) | 32 | 31 | 30 | 31 |
| (f) Weld strength retention (%) | 90 | 89 | 87 | 89 |
| (g) Creep rupture time (hrs) | 120 | 95 | 90 | 92 |
| (e) Chemical resistance (° C.) | ○ | ○ | ○ | ○ |
| (h) Water-vapor permeability (g/m$^2$ · 24 h) | 0.4 | 0.4 | 0.5 | 0.4 |
| (j) Adhesive strength of welding (MPa) | 32 | 31 | 31 | 33 |

TABLE 4

|  | Example 8 | Example 9 | Example 10 | Example 11 |
|---|---|---|---|---|
| PPE-1 (parts by weight) | 30 | 40 | 15 | 20 |
| PP-1 (parts by weight) | 70 | 60 | 85 | 80 |
| SEPS-1 (parts by weight) | 10 | 10 | 20 | — |
| SEPS-2 (parts by weight) | — | — | — | 10 |
| (a) Izod impact strength (J/m) | 210 | 220 | 270 | 260 |
| (b) Flexural modulus (MPa) | 1700 | 2010 | 1730 | 1640 |
| (c) High-temperature bending modulus (MPa) | 600 | 800 | 580 | 590 |
| (d) Deflection temperature under load (° C.) | 86 | 99 | 82 | 81 |
| (f) Weld strength (MPa) | 29 | 25 | 29 | 28 |
| (f) Weld strength retention (%) | 83 | 74 | 87 | 86 |
| (g) Creep rupture time (hrs) | 30 | 8 | 70 | 24 |
| (e) Chemical resistance (° C.) | ○ | ○ | ○ | ○ |
| (h) Water-vapor permeability (g/m$^2$ · 24 h) | 0.7 | 0.9 | 0.8 | 0.7 |
| (j) Adhesive strength of welding (MPa) | 26 | 24 | 26 | 27 |

TABLE 5

|  | Comp Example 6 | Comp Example 7 | Comp Example 8 | Comp Example 9 |
|---|---|---|---|---|
| PPE-1 (parts by weight) | 30 | — | — | 30 |
| PPE-2 (parts by weight) | — | 3 | 20 | — |
| PS (parts by weight) | — | — | 2 | 70 |
| PP-1 (parts by weight) | — | 97 | 78 | — |
| PP-5 (parts by weight) | 70 | — | — | — |
| SEPS-1 (parts by weight) | 10 | 2 | 1 | 10 |
| (a) Izod impact strength (J/m) | 160 | 60 | 50 | 180 |
| (b) Flexural modulus (MPa) | 1650 | 1950 | 2020 | 2350 |
| (c) High-temperature bending modulus (MPa) | 590 | 680 | 790 | 1100 |
| (d) Deflection temperature under load (° C.) | 85 | 84 | 94 | 105 |
| (f) Weld strength (MPa) | 21 | 30 | 21 | 32 |
| (f) Weld strength retention (%) | 61 | 90 | 60 | 90 |
| (g) Creep rupture time (hrs) | 2 | 70 | 2 | 90 |
| (e) Chemical resistance (° C.) | ○ | ○ | ○ | X |
| (h) Water-vapor permeability (g/m$^2$ · 24 h) | 0.7 | 0.4 | 0.7 | 2.3 |
| (j) Adhesive strength of welding (MPa) | 27 | 31 | 25 | 33 |

What is claimed is:

1. A secondary battery case comprising:
    a molded product of a thermoplastic resin composition having a weld zone from a molding process said thermoplastic resin composition comprising:
    (A) a polyphenylene ether-based resin,
    (B) a crystalline polypropylene resin which is a homopolymer or a copolymer of polypropylene, and
    (C) a hydrogenated block copolymer comprising an aromatic vinyl compound polymer block and a conjugated diene compound polymer block,
    the (A)/(B) ratio by weight being 7/93 to 70/30,
    the amount of (C) being 2 to 40 parts by weight based on 100 parts by weight of (A) and (B) combined,
    the melt flow rate of said crystalline polypropylene resin (B) being 0.1 to 10 g/10 min as measured at 230° C. and under a load of about 21.17 N,
    the density of the propylene polymer moiety in said crystalline polypropylene resin being not less than 0.906 g/cm$^3$.

2. The secondary battery case according to claim 1, wherein the crystalline polypropylene resin is a homopolymer or a copolymer and forms a matrix constituting a continuous phase of the thermoplastic resin composition.

3. The secondary battery case according to claim 1, wherein the thermoplastic resin composition contains (C) the hydrogenated block copolymer comprising aromatic vinyl compound polymer blocks and conjugated diene compound polymer blocks in an amount of 3 to 30 parts by weight based on 100 parts by weight of (A) and (B) combined.

4. The secondary battery case according to claim 1, wherein (C) the hydrogenated block copolymer comprising aromatic vinyl compound polymer blocks and conjugated diene compound polymer blocks contains 50 to 85% by weight of the units derived from the aromatic vinyl compound.

5. The secondary battery case according to claim 1, wherein the ratio by weight of (A) the polyphenylene ether-based resin to (C) the hydrogenated block copolymer comprising aromatic vinyl compound polymer blocks and conjugated diene compound polymer blocks, (A)/(C), is 1/1 to 10/1.

6. The secondary battery case according to claim 1, wherein the ratio by weight of (A) the polyphenylene ether-based resin to (B) the crystalline polypropylene resin which is a homopolymer or a copolymer, (A)/(B), is 7/93 to 25/75; (C) the hydrogenated block copolymer comprising aromatic vinyl compound polymer block(s) and conjugated diene compound polymer block(s) containing 50 to 85% by weight of the units derived from aromatic vinyl compound is contained in an amount of 3 to 30 parts by weight; and the ratio by weight of (A) the polyphenylene ether-based resin to (C) the hydrogenated block copolymer comprising aromatic vinyl compound polymer block(s) and conjugated diene compound polymer block(s), (A)/(C), is 1/1 to 10/1.

7. A secondary battery case comprising:

two or more molded products of a thermoplastic resin composition, which molded products are welded with each other, said thermoplastic resin compositions each comprising:
(A) a polyphenylene ether-based resin,
(B) a crystalline polypropylene resin which is a homopolymer or a copolymer of polypropylene, and
(C) a hydrogenated block copolymer comprising an aromatic vinyl compound polymer block and a conjugated diene compound polymer block, the (A)/(B) ratio by weight being 7/93 to 70/30, the amount of (C) being 2 to 40 parts by weight based on 100 parts by weight of (A) and (B) combined, the melt flow rate of said crystalline polypropylene resin (B) being 0.1 to 10 g/10 min as measured at 230° C. and under a load of about 21.17 N, the density of the propylene polymer moiety in said crystalline polypropylene resin being not less than 0.906 g/cm$^3$.

8. The secondary battery case according to claim 7, wherein in the welding conditions, the surface temperature of the part to be bonded in the bonding operation is kept at 170 to 340° C.

9. The secondary battery case according to claim 7, wherein in the welding conditions, the surface temperature of the part to be bonded in the bonding operation is kept at 190 to 320° C.

10. The secondary battery case according to claim 7, wherein in the welding conditions, the surface temperature of the part to be bonded in the bonding operation is kept at 190 to 300° C.

11. The secondary battery case according to claim 7, wherein the range of the (A)/(B) ratio by weight is 9/91 to 22/78.

12. The secondary battery case according to claim 7, wherein the range of the (A)/(B) ratio by weight is between 10/90 to 19/81.

* * * * *